United States Patent
Rog et al.

(10) Patent No.: US 7,206,336 B1
(45) Date of Patent: Apr. 17, 2007

(54) METHOD OF INCREASING NOISE IMMUNITY DURING RECEPTION OF SIGNALS FROM SATELLITE NAVIGATIONAL SYSTEMS

(75) Inventors: Andrey Leonidovich Rog, Moscow (RU); Boris Dmitrievich Fedotov, Saint-Petersburg (RU)

(73) Assignee: Samsung Electronics Co., Limited, Gyungki-Do (KR)

( * ) Notice: Subject to any disclaimer, the term of this patent is extended or adjusted under 35 U.S.C. 154(b) by 0 days.

(21) Appl. No.: 09/554,392

(22) PCT Filed: Sep. 15, 1998

(86) PCT No.: PCT/RU98/00286

§ 371 (c)(1),
(2), (4) Date: Jun. 6, 2000

(87) PCT Pub. No.: WO00/16119

PCT Pub. Date: Mar. 23, 2000

(51) Int. Cl.
*H04B 1/707* (2006.01)

(52) U.S. Cl. .................. 375/150; 375/136; 375/137; 455/296

(58) Field of Classification Search ............... 375/205, 375/208, 1, 150, 136, 137; 342/357.14, 357; 455/296
See application file for complete search history.

(56) References Cited

U.S. PATENT DOCUMENTS 5,495,499 A * 2/1996 Fenton et al. ............... 370/479
5,781,152 A * 7/1998 Renard et al. .......... 342/357.08

FOREIGN PATENT DOCUMENTS

EP 0 552 975 A 7/1993
WO WO 97/06446 A 2/1997

OTHER PUBLICATIONS

Zhodzicshsky, Multipath Error Reduction In A Spread Spectrum Receiver For Ranging For Ranging Applications, Feb. 1997, W 97/06446.*

(Continued)

*Primary Examiner*—Jay K. Patel
*Assistant Examiner*—Eva Zheng
(74) *Attorney, Agent, or Firm*—Sughrue Mion, PLLC

(57) ABSTRACT

Errors are reduced when tracing PRNS code delay, especially in receivers operating on signals with rather low code frequency (C/A code) under multibeam effect without deterioration or with minimum deterioration of the signal-to-noise ratio. A method of increasing noise immunity during reception of signals from satellite navigational systems and a device for realizing the same includes radio modules, an analog-to-digital converter, a digital correlation device and digital correlators. A discrimination signal is generated with a variable delay of the signal copy with respect to the exact copy. The use of the correcting sequence of gating digital signals makes it possible to eliminate the multipath effect at a delay of the reflected signal larger than 1.5 d and reduces its negative effect starting from a delay value greater than d/2. In this case, the energy losses compared with a pure mode of the narrow correlator are increased only by 1.76 dB.

14 Claims, 6 Drawing Sheets

OTHER PUBLICATIONS

Figure 1:
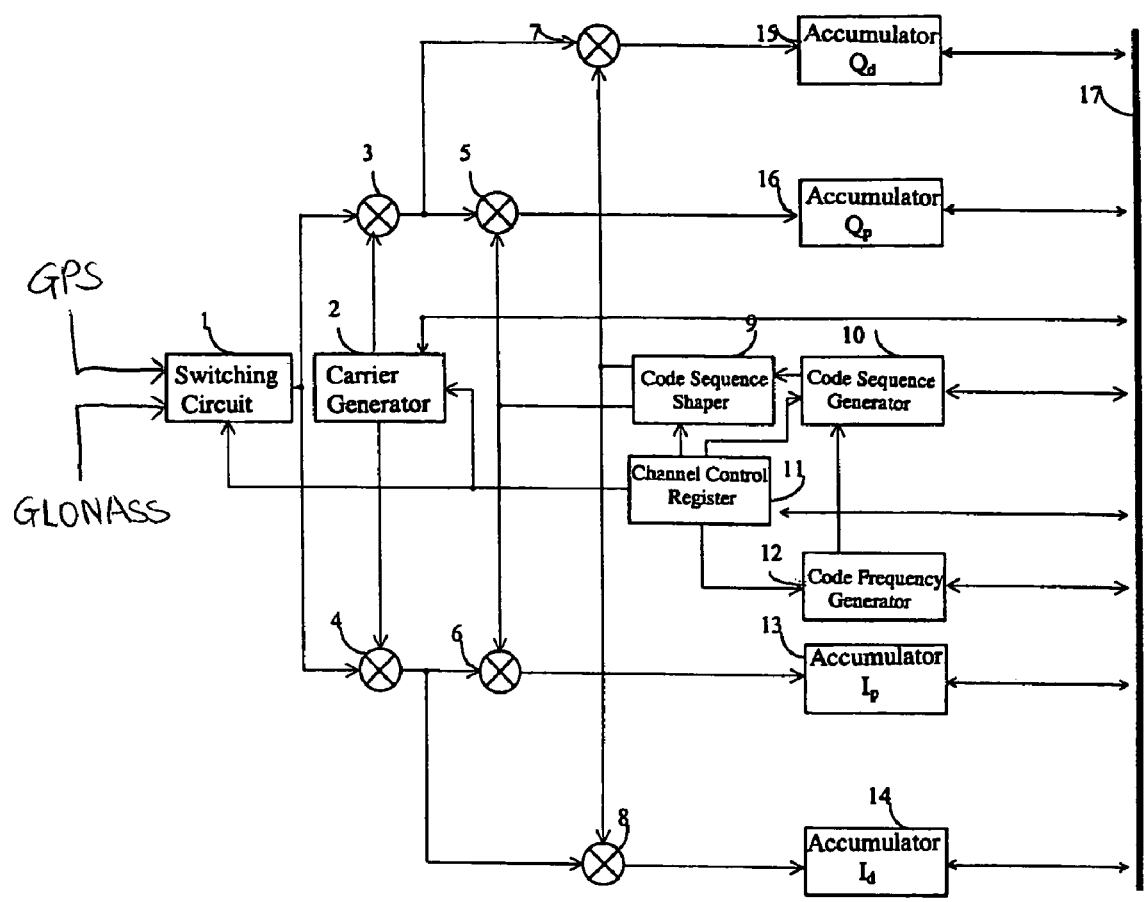

Goiser A M J et al Institute of Electrical and Electronics Engineers: "Synchronizing a Digital GPS Receiver" Melecon '96. 8th. Mediterranean Electrotechnical Conference. Industrial Applications in Power Systems, Computer Science and Telecommunications. Bari, IT., May 13-16, 1996, Melecon. Mediterranean Electrotechnical Conference, New York, IEEE, US, vol. vol. II Conf. 8, May 13, 1996, pp. 1043-1046, XP000699435 ISBN: 0-7803-3110-9 Sections I.B, III, IV—.

* cited by examiner

METHOD OF INCREASING NOISE IMMUNITY DURING RECEPTION OF SIGNALS FROM SATELLITE NAVIGATIONAL SYSTEMS

TECHNICAL FIELD

The present invention relates to systems of reception of digital radio signal coded by pseudonoise sequences, which in particular are used in the systems of global positioning GPS (USA) and GLONASS (Russia), and adapted for operation under distorted parameters of the received signal due to the multipath effect.

BACKGROUND OF THE INVENTION

The passive receivers of pseudonoise signals transmitted by the satellites of global positioning systems GPS USA) and GLONASS (Global Navigational Satellite System, Russia) are now widely used and allow the user to accurately determine his coordinates (latitude, longitude, height) and time. The global positioning systems are described in the following references: "Global Navigational Satellite System—GLONASS". The interface control document. KNIZ VKS, Russia, 1995, and also in "Global Position System. Standard Positioning Service. Signal Specification." USA, 1993.

The known receivers of a pseudonoise signals (RPNS) operate with a complex digital radio signal consisting of a plurality of signals, transmitted from the satellites which are within the limits of direct visibility, a noise component, as well as components caused by the interference due to repeated reflections of the direct signal from various sites of the earth surface, constructions, etc. This interference causing distortion of the parameters of the signal being received and, as a result, a low accuracy of the receiver characteristics is known as a "multipath" effect.

For detection, tracing and definition of the parameters of the signal being received, the signal is amplified in the RPNS, converted into an intermediate frequency and digitized in the radio-frequency unit of the receiver. After that the digital correlation technique is used for the final detection of the signals. Known in the art are digital correlators performing the correlation of the incoming complex digital radio signal by multiplying its digits by the local copy of the sought signal generated inside the correlator followed by accumulation of the correlation results through a definite time interval. As a rule, this interval is taken equal to 1 millisecond, that is equal to the length of the code sequence/ of the GPS/GLONASS code. To close the loop of tracing the frequency (phase) of a signal being received and the delay of the coded use is made of the calculator, which reads out the information from the accumulator and closes the tracing loop by means of its routine. For tracing the code (code delay), the tracing cycle uses the results of correlation of the input signal with the early (advanced) and late (delayed) copies of this signal or with a difference (early-minus-late) copy. In this case, besides the main (direct) signal coming from the satellite there is an additional delayed signal due to the multipath effect that will result in distortion of the discrimination characteristic of the tracing cycle and, as a corollary, appearance of an additional error in the range finding. In addition, since the signal coming with the satellite is rather weak and its amplitude much below the natural thermal noise level, the correlator should ensure the best possible signal-to-noise ratio.

It is also known, that the use of a narrow correlator in the tracing cycle behind the code increases the signal-to-noise ratio and, besides, reduces the negative multipath effect (cf. A. J. Dierendonck, P. Fenton, T. Ford "Theory and Performance of Narrow Correlator Spacing in GPS receiver", Navigation: Journal of The Institute of Navigation Vol. 39, No. 3, Fall. 1992. See also P. Fenton, A. J. Dierendonck "Pseudorandom noise ranging receiver which compensates for multipath distortion by dynamically adjusting the time delay spacing between early and late correlators", U.S. Pat. No. 5,390,207, Feb. 14, 1995). However, the narrow correlator only weakens the multipath effect and does not allow one to eliminate this effect completely.

Also known in the art are devices such as a "gating correlator" and an "improved gating correlator", permitting one to lower the negative effect of the multipath transmission even more (cf. "L. Garin, J-M. Rousseau "Enhanced Strobe Correlator Multipath Rejection for Code and Carrier", ION-GPS 1997, Session B2). The "gating correlator", based on a linear combination of two narrow correlators, excluding the multipath effect for a significant amount of the delayed signals, nevertheless, worsens the signal-to-noise ratio by 3 dB relative to the source narrow correlator. The "improved gating correlator" operating in the early strobe field and thereby performs the correlation of the signal part near to front edge eliminating the multipath effect for even a greater amount of the delayed signals but, at the same time, it worsens the signal-to-noise ration by 6 dB relative to the narrow source correlator. The narrow source correlator as mentioned here is one of the two narrow correlators whose combination forms a "gating correlator" and which has a minimum temporary shift relative to the exact copy of the signal being traced.

The most relevant technical solution with respect to the proposed invention are the method and device described in PCT application WO 97/06446 of Feb. 20, 1997 "Multipath error reduction in a spread spectrum receiver for ranging applications". In this application, in order to form the signal from the discriminator output for tracing code delay, an offer is made to form a differential copy of a pseudonoise signal, consisting of a "sequences of identical non-zero gate pulses formed on the boundary of the characters of a pseudonoise sequence, such that the duration of each gate pulse is less than pulse duration in the pseudonoise code; the gate pulse is positive in the square positive and negative parts and also has positive or negative polarity in the central part that corresponds to the change in the positive or negative side of the pseudonoise sequence characters". In one of the embodiments described in the cited application, a difference pseudo-random sequence (PRS) is proposed to be formed by generation of four replicas: "an early replica advancing the exact copy by 1/(2k) fraction of the RPS character, a late replica delayed with respect to the exact copy by 1/(2k) by a fraction of the RPS character, an early replica advancing the exact copy by N/(2k) fraction of the character, and one more late replica delayed with respect to the exact RPS by N/(2k) character, where N and k are the whole numbers and N<k. In particular, it is offered to select k=10, N=2. By subtracting from the early copy the corresponding late one, a difference copy is obtained and used in the narrow correlator. Then, by subtracting from one difference copy the second copy, one gets a sequence of gate pulses similar to those described above. Thus, the described method completely corresponds to the method of "gating correlation", mentioned above and, accordingly, has similar disadvantages. So in the system with four replicas the signal-to-noise ratio will be By N times worse, than for the source narrow correlator with an offset ±1/(2k) of the character. Therefore, for N=2, the loss will be up to 3 dB.

DISCLOSURE OF THE INVENTION

The object to be attained by the invention is a decrease of the errors when tracing the delay of the PRNS code, especially in the receivers operating on signals with rather low frequency of the code (code /), under the multipath effect without deterioration or with minimum deterioration of the signal-to-noise ratio.

The proposed receiver comprises units usually used in such radio receivers for amplifying the input signal and converting the input carrier into an intermediate frequency signal of an analog-digital converter converting the analogue signal into a digital signal, a digital correlation device consisting of a plurality of single-type channels, each of which performs tracing one pseudonoise signal (PNS) and includes controlled generators of a carrier frequency and code frequency for tracing the frequency (phase) of the PNS carrier and the code delay. The device also comprises digital correlators, whose output information is used for closing the cycle of tracing the code delay. These correlators generate a discrimination signal with a variable delay of the signal copy relative to the exact copy. After the mode of tracing the code has been set with the least possible difference between the early and late copies of the signal, i.e. after setting the mode of tracing with the narrow correlator, the correlator performs the correction of the multipath effect by using a special gating sequence of digital signals. The tracing of the carrier (phase) of the signal and the code is generally non-coherent. Each channel of the correlation device comprises at least two correlators whose output information is used for forming a loop circuit for tracing the code delay. The correlators correlate the input digitized signal with its local copies, which can have various delays relative to the exact copy. Thus, the correlators form at their outputs the results of correlation of the input signal with early and late copies, or with exact and difference copies, i.e. "early minus late" copies for generating the discriminator signal of the code tracing loop. In so doing the variable offset value of the early and late copies relative to the exact copy of the signal, which can make value equal only to a fraction of the PRS character, allow one to perform tracing in the narrow correlator mode.

In addition, for compensation of the multipath effect, the structure of the tracing channel comprises a correlator generating a sequence of gating digital signals such that the gating signal length is equal to the delay d between the early and late copies of the pseudo-random sequence. The gate pulse polarity coincides with the polarity of the prior character of the exact copy and its beginning is delayed relative to the end of the character of an the exact copy of the pseudo-random sequence on the value equal to d/2. The essential fact is that the result of the correlation of the sequence of gate pulses and the input signal is added to the output signal of the difference discriminator only after the servomechanism enters the "narrow correlator" mode. The difference discriminator is an output of a correlation channel, in which the difference (early-minus-late) copy of the input signal correlates with PNS input or the results of the subtraction of the late correlator output digital signal from the early correlator output signal, that is the same from the functional point of view.

Apart from this fact, when using the separate correlator generating a correcting gating sequence and performing correlation of the given sequence with the input PNS, the output of such correlation can be estimated by the calculator for determining the multipath effect value.

This approach makes it possible to get a number of advantages as compared with the prior art solutions. Especially, it concerns the GPS and GLONASS receivers of the/range, in which, on the one hand, the power of the input signal is very low and is at a level much below the noise level and, on the other hand, the power of the reflected (multipath) signal can reach a significant value, in some cases equal to and even exceeding the power of the direct signal thus causing essential errors in the calculation of the navigational parameters. The use of a correcting sequence of gating digital signals allows one to eliminate the multipath effect at a delay of the reflected signal greater than 1.5 d and reduces its negative influence from a delay greater than d/2. Thus the power loss as compared with the pure mode of the narrow correlator increases only by 1,76 dB.

THE BRIEF DESCRIPTION OF THE DRAWINGS

The invention is explained by the following drawings:

FIG. 1 is a block diagram of the typical channel of the correlator of the pseudonoise signal receiver used for tracing the frequency (phase) and code delay, where 1—switching circuit to switch the input signals, 2—carrier generator, 3—mixer, 4—mixer, 5—mixer, 6—mixer, 7—mixer, 8—mixer, 9—code sequence shaper, 10—code sequence generator, 11—channel control register, 12—code frequency generator, 13—accumulator Ip, 14—accumulator Id, 15—accumulator Qd, 16—accumulator Qp, 17—control bus.

Figure 2:
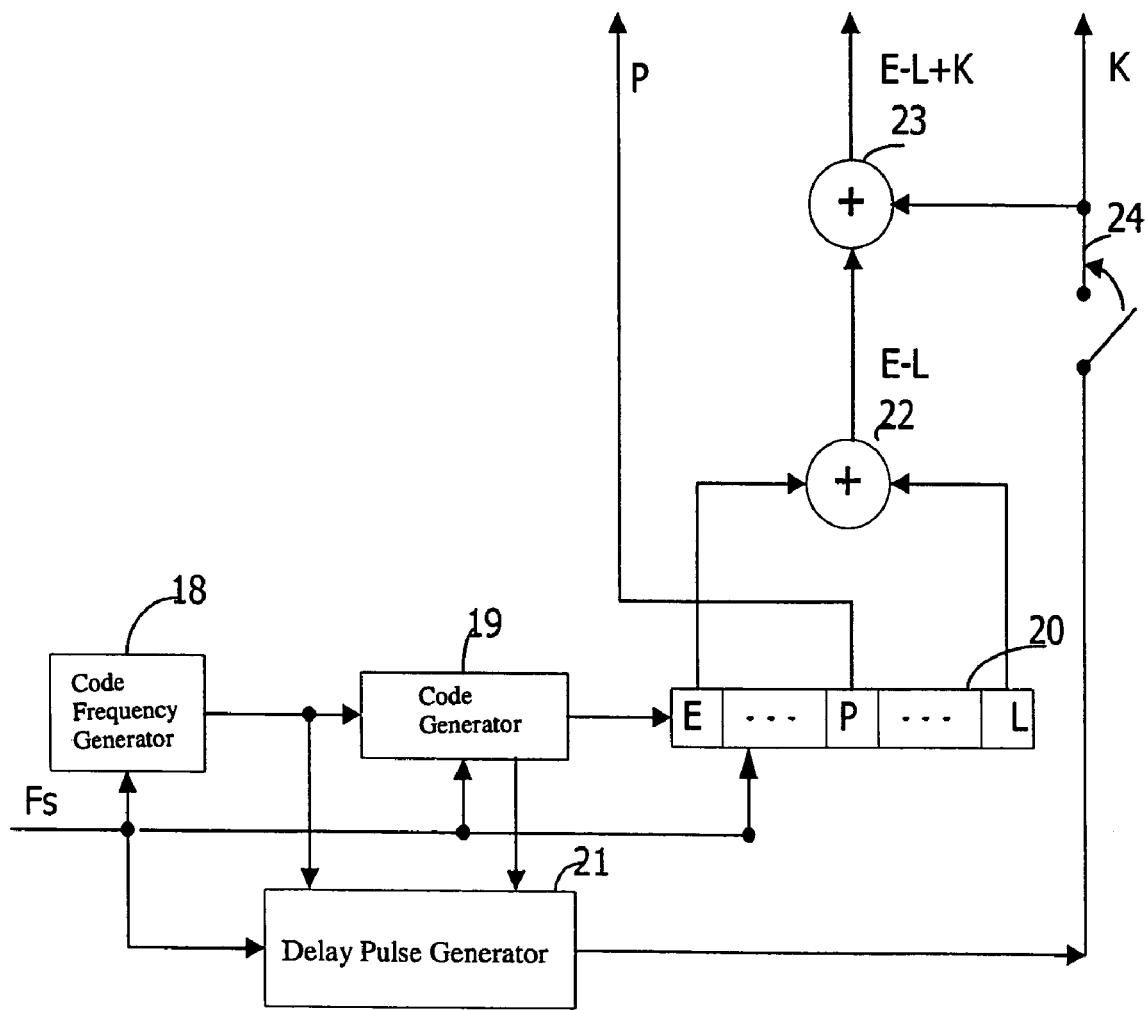

FIG. 2 is a block diagram of the code generator generating a sequence of difference digital signals (early-minus-late) in the narrow correlator mode, as well as a sequence of gating digital signals for multipath compensation, where 18—code frequency generator, 19—code sequence generator, 20—shift register, 21—delayed pulse shaper, 22—"XOR" adder, 23—"XOR" adder, 24—key.

Figure 3:
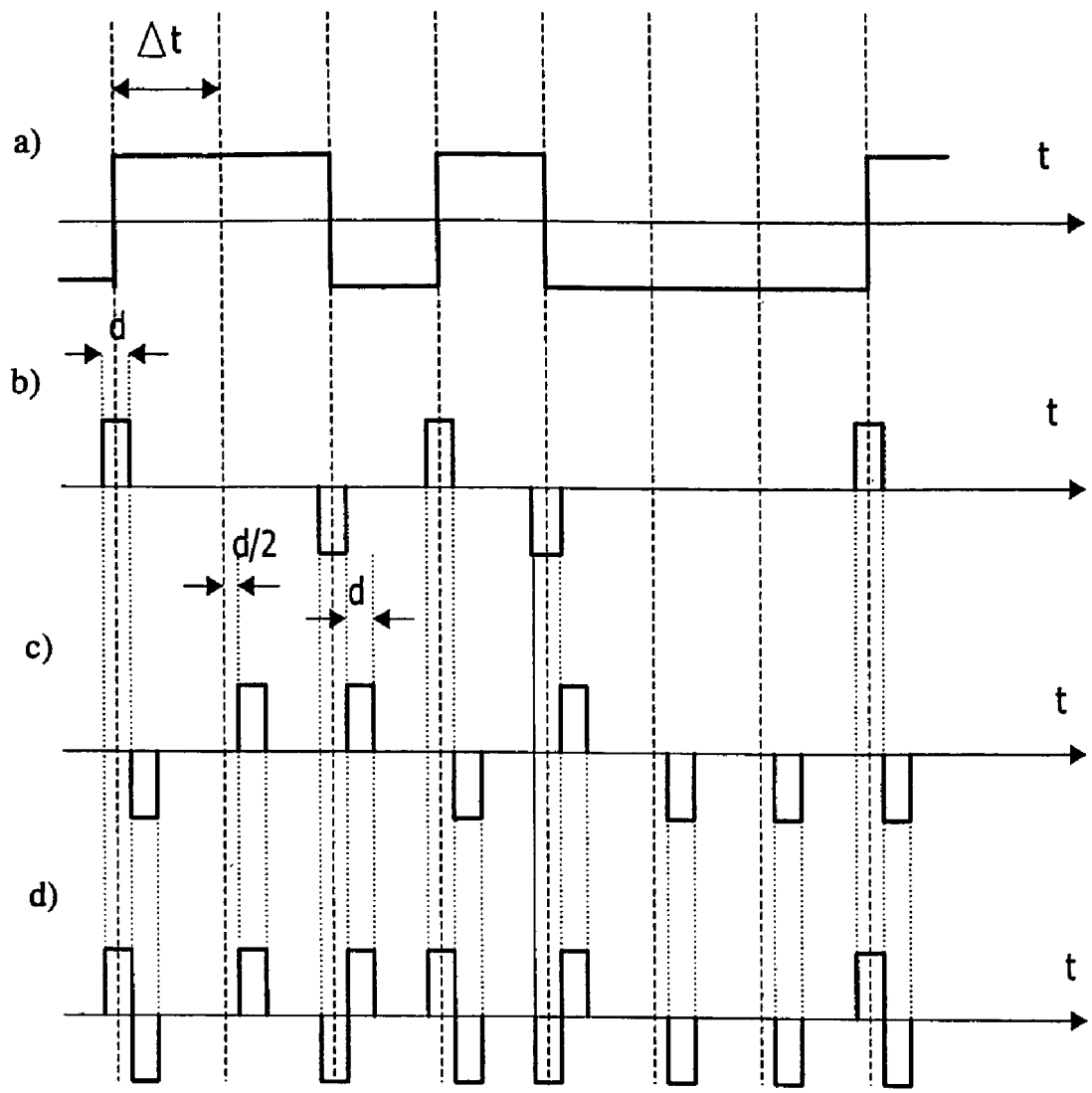

FIG. 3—demonstrates a sequence of gating digital signals at the code generator output that is used in the narrow correlator (FIG. 3 b) and in the narrow correlator to compensate the multipath effect (FIG. 3 c, 3 d). The PNS sequence at the code generator output with a code period Δt is shown in FIG. 3a.

Figure 4:
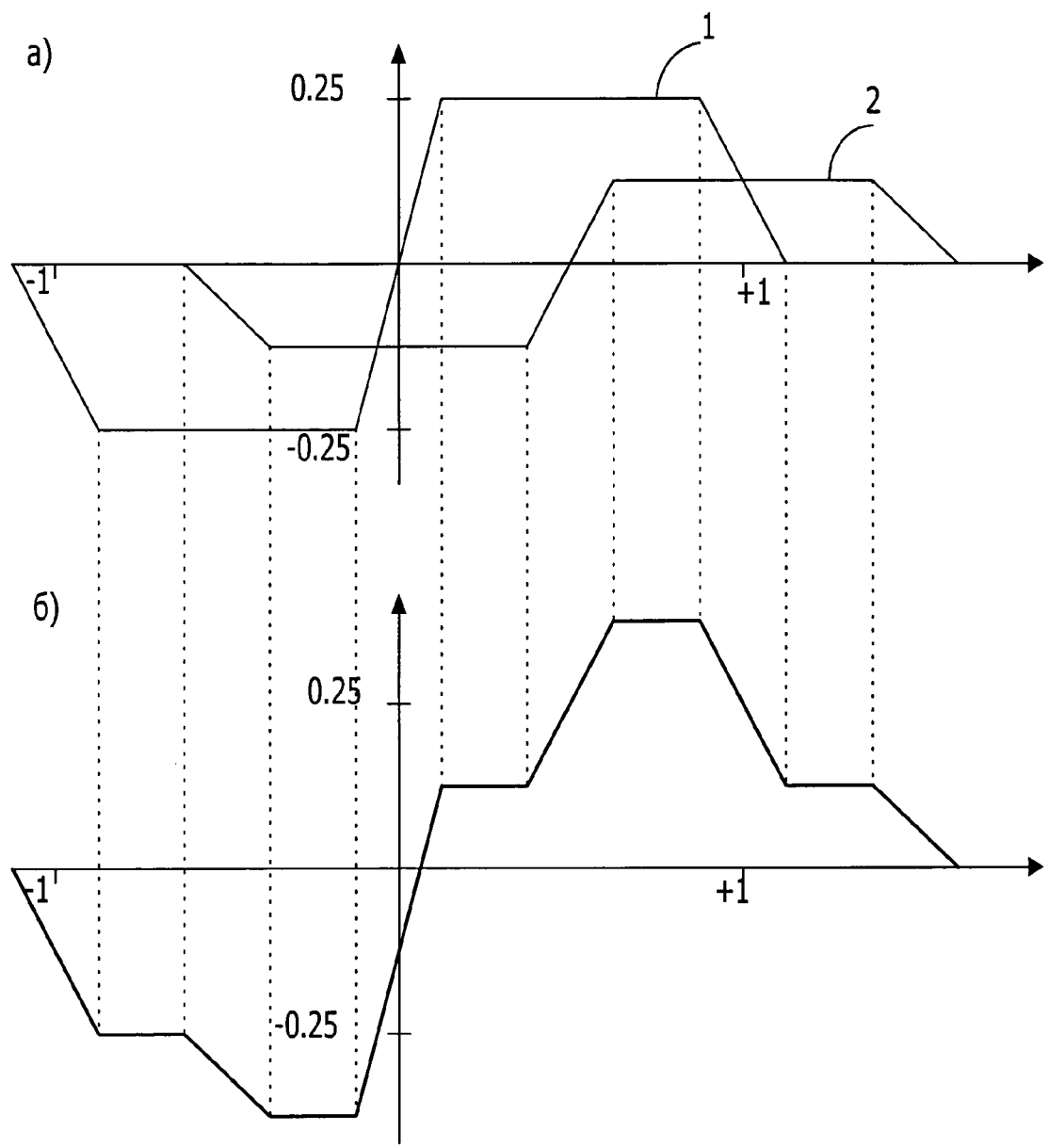

FIG. 4 demonstrates the distortion of the difference signal from the narrow correlator output caused by the presence of a delayed multipath signal. Curve 1 in FIG. 4 a represents the inverted output of the discriminator stipulated by the direct signal. Curve 2 is a response of the discriminator on the delayed multipath signal. FIG. 4 b shows the inverted signal.

Figure 5:
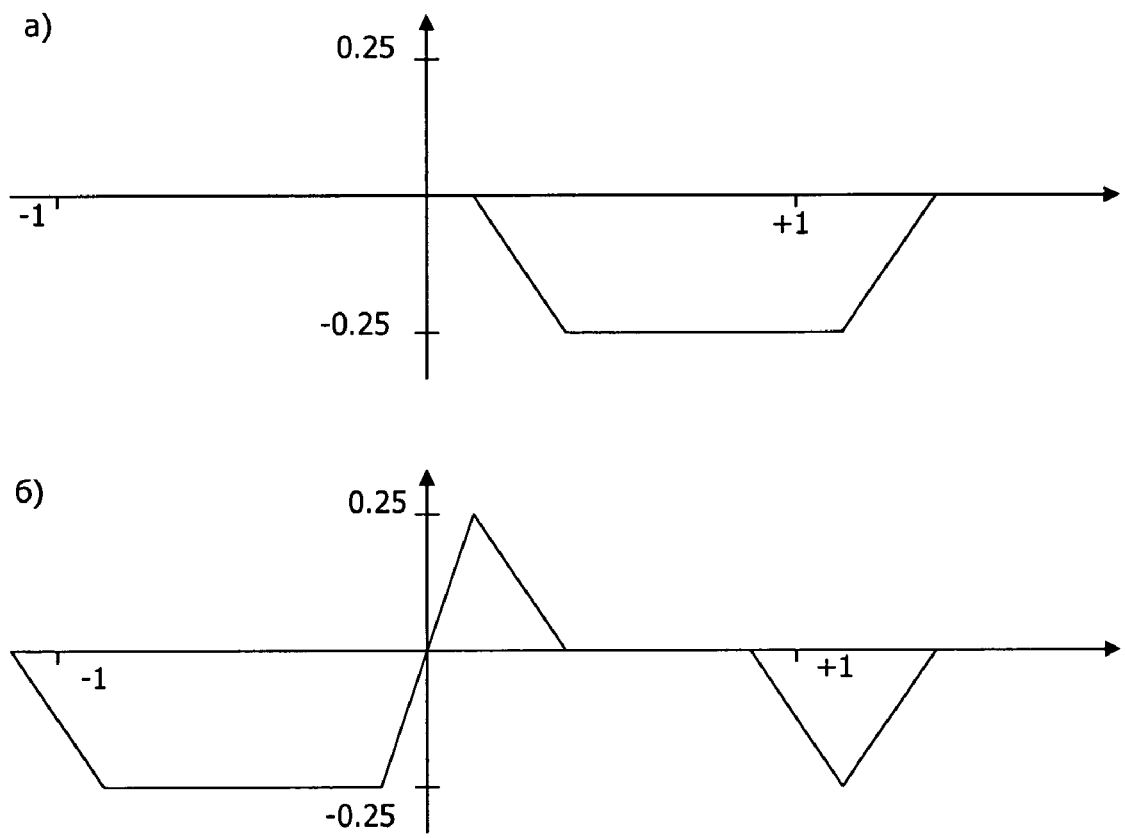

FIG. 5 demonstrates the correlation function of the gating digital signal compensating the multipath effect (FIG. 5), and also the joint correlation function of the narrow correlator and of the correcting gating signal (FIG. 5 b).

Figure 6:
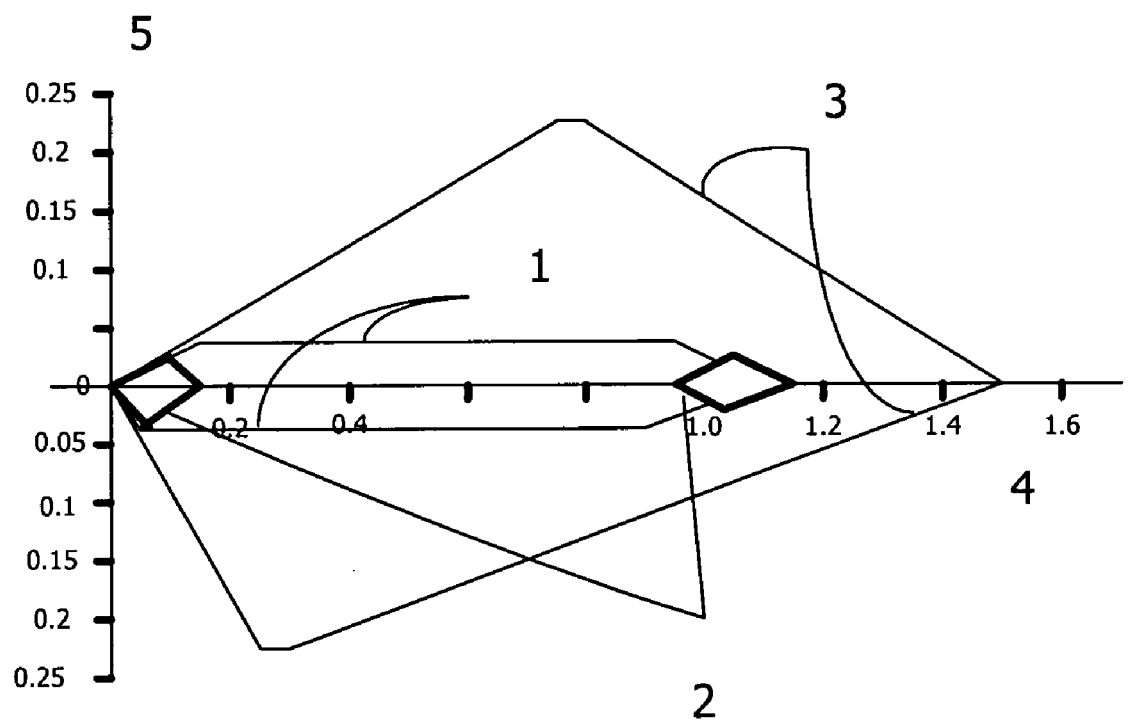

FIG. 6 is a diagram of the calculated errors caused by multipath effect for various types of correlators, where 1 is a narrow correlator, 2 is a narrow correlator with correcting gating signals, 3 is a chip-correlator, 4 is a multipath delay, / is a chip, 5 is a tracing error, / is a chip.

PREFERABLE EMBODIMENTS OF THE INVENTION

FIG. 1 shows a block diagram of the typical signal of the correlator used for tracing the frequency (phase) and code of the receiver of the GPS or GLONASS system or the combined GPS/GLONASS system. The figure represents a universal GPS/GLONASS correlator operating with an actual input signal after an analog-to-digital converter. Nevertheless, the offered approach is completely applicable to the case of operation with a pair of quadrature input signals (input in-phase component I and quadrature component Q of the signal). Usually a receiver has some single-type tracing channels to monitor the signals of several satellites simultaneously. Since this feature does not reflect the essence of the proposed invention, no detailed description of the radio engineering part of the digital receiver is given here. Such a system, as a rule, consists of a low-noise input amplifier, a high-frequency bandeaus filter, a mixer (or mixers) reducing the frequency which include a voltage-controlled generator and a closed-loop intermediate-frequency filter fed with a signal from a reference generator which, as a rule, is temperature-compensated. The intermediate frequency signal from the mixer output is filtered by the IF filter and digitized in the analog-to-digital converter. Thus, the correlator input is fed with a digital signal having a sampling rate satisfying the Nyquist stability criterion. In this figure the input signals No.1 (GPS) and No.2 (GLONASS) are applied to the input signal switching circuit 1 which selects one of the two signals that will be processed in the channel. A carrier frequency generator 2 produces in-phase (cos) and quadrature (sin) components of the local signal phase, said components correlating with the input signal in mixers 3 and 4. The carrier frequency generator is controlled by a processor through a control bus 17 for closing the tracing cycle behind the carrier and phase of the input signal. After the carrier has been removed, the in-phase and quadrature components of the signal correlate in the mixers 5,6,7,8 with the local copies of the code sequence of the input signal from the code sequence generator 9. The copy of the code sequence is formed with the help of a set of units including a code frequency generator 12, a code sequence generator 10 and a code sequence delay generator 9. The code frequency generator 12 generates a code sequence clock signal, which is applied to the input of the code sequence generator 10. The code frequency generator 12 is monitored by a processor through the bus 17 to control the cycle for tracing the code delay. On the basis of the clock signal from the code frequency generator 12, the code sequence generator 10 generates a local copy of the code sequence, which is unique for each satellite of the GPS system and is identical to all satellites of the GLONASS system having a device for frequency division of the signals. The code sequence type is preset by the processor through a control bus 17. The code sequence is applied to the delay generator 9, which performs a temporary shift of the signal copy that is a relatively exact (in time) and forms at the output an early copy ( ) and late copy (L) or an exact (identical) copy ( ) of the signal and a difference (−L) (early-minus-late) copy of the pseudonoise sequence. The local PNS copies correlate with the input signal in the correlators 5,6,7,8 and the results of this correlation are stored in the accumulators 13,14,15,16. In the case of operation with the exact and difference copies of the input signal, the accumulator 16 stores the quadrature component of correlation of the exact copy of the signal Qp, the accumulator 15 stores the quadrature component of correlation of the difference copy Qd, the accumulator 13 stores the in-phase component of the exact copy Ip, the accumulator 14 stores the in-phase component of the difference copy Id. The correlation result is red from the accumulators by the processor through the bus 17. The time of accumulation of the correlation results is also monitored by the processor.

The control of the working conditions of the tracing channel is carried out by the control register of the channel 11 which, in turn, is controlled by the processor through the bus 17 and which is connected to units 1,2,9,10,12. The function of the channel control register consists in switching between the following modes: "Search"/"tracing", GPS/GLONASS, "broad/narrow" correlator, "narrow correlator"/"narrow correlator with multipath correction". By reading out the results of correlation Ip, Qp, Qp, Qd from the accumulators 13,14, 15,16 for the whole accumulation period, which is usually selected equal to the duration of the epoch/of the code 1 ms and controlling the carrier frequency generator 2 and the code frequency generator 12, the processor monitors the operation of tracing cycles following the frequency (phase) of the input signal the code delay, thus ensuring the tracing of the input PNS and measurement of its parameters.

It is well known that the narrow correlator used in the difference signal shapers at the output of the discriminator in a closed loop of tracing the code, in which the delay between the early and late copies of the signal is less than the length of one character of the code sequence, has a number of advantages compared to the usual broad correlator with a difference between the copies in one character. First of all, it is the best signal-to-noise ratio at the output of the discriminator of the closed loop for tracing the code delay, which is determined by the expression:

$I_{E-L}I_P + Q_{E-L}Q_P$, in case, when the punctual and difference correlators are used, or $I_E^2 + Q_E^2 - (I_L^2 + Q_L^2)$, when the signal of the discriminator is formed with the help of the early and late correlators.

Besides the narrow correlator reduces the negative effect of the multipath propagation. Using the narrow correlator gating impulses compensating the multipath effect, it is possible to achieve the even greater weakening of the influence of the multipath propagation on the system operation and in some cases to eliminate it completely.

Shown in FIG. 2 is a block diagram of the operation of the code sequence delay generator used together with the code frequency generator and with the code sequence generator which form at their output exact and difference (early-minus-late) replicas of the input signal. In addition, the shaper 9 in response to the control signal generates a sequence of gating signals compensating the multipath effect on the difference replica. The code frequency generator 18, based on input reference frequency Fs, in response to the control signals of the processor produces a necessary code frequency (with needed Doppler offset). The code generator 19 based on the input code frequency and on the signal from the code sequence processor forms at the output a replica of the input PNS. The generated sequence is applied to the input of the shift register 20 having branches for shaping the punctual ( ), early (E) and late (L) copies of the signal. The early and late copies are added in the "XOR" adder 22 producing a difference copy signal at its output. The delayed pulse generator 21, using the signal of the reference frequency Fs, code frequency signal from the output of the code frequency generator 18 and the information on the polarity of the current character pseudo-random sequence from the code generator 19, determines the boundaries of code characters and produces an output digital signal to compensate for the multipath effect, which will start at the end of each character of an exact copy of a pseudonoise sequence with a delay d/2, equal to half the delay between the early and late copies of the signal, and has a polarity of the exact copy character. When the switch 24 is in the "on"

position, the adder "XOP" 23 receives the difference copy digital signal and the signal of a sequence of gate pulses, thereby producing at its output a difference discriminator signal with correcting gate pulses compensating the multipath effect. When the switch 24 is off, the shaper produces at its output only a difference copy of the signal. One may be certain, that the difference copy of the (−L) signal for the narrow correlator mode represents a sequence of digital signals with duration equal to the delay between the early and late copies and the signals occur only at a change of polarity of the code characters having positive polarity. In the case of changing the character polarity in the positive direction, the temporary centers of digital signals coincide with the boundaries of the exact code characters. The remark on the character polarity in the positive direction is conditional; it should be understood in the sense that the order of change of the polarity of characters should determine the polarity of the difference character, in which case it is absolutely not important what direction is considered positive.

FIG. 3 illustrates the operation of the above-described character sequence forming. FIG. 3 shows the PNS sequence at the output of the code generator with a code period Δt. FIG. 3b shows a sequence of digital pulses from the narrow correlator output, i.e. after the adder 22. FIG. 3 demonstrates a sequence of gating correcting signals at the output of the delayed pulse generator. Finally, FIG. 3d demonstrates a combined signal, . . . the signal from the narrow correlator output jointly with the gating signals for the multipath adjustment.

FIG. 4 illustrates the negative effect of the multipath phenomenon on the narrow correlator operation. Curve 1 in FIG. 4 represents an inverted output of the discriminator stipulated by the direct signal. Curve 2 is a response of the discriminator on delayed (multipath) signal, whose amplitude is equal to a half of the amplitude of the direct signal, and the delay makes a half of the duration of the character of the PNS code sequence. The delay between the early and late copies of the signal makes up 0.25 duration of the PNS character. For simplicity the calculation is made for the ideal case of a IF filter with an infinite passband. In the case of arrival of both signals the discriminator output represents a summarized response to the direct and delayed signal (FIG. 4b, the signal is inverted). It is obvious that in this case the zero output of the discriminator corresponds to non-zero delay of the direct signal, i.e. the error in the range finding due to the multipath effect takes place.

The use of the correcting gating signals together with the narrow correlator allows one to reduce this negative effect. This is illustrated in FIG. 5. FIG. 5 shows the result of correlation of the correcting signal with input PNS. In its combination with the output of the narrow correlator discriminator (curve 1 in FIG. 4), we have the narrow correlator discriminator output with correcting gating signals shown in FIG. 5b (an inverted signal). It is clear that in this case the multipath signals with a delay longer than 1.5 d do not render any effect on the discriminator signal. There is a possibility of appearance of an error signal of the discriminator with a delay of the multipath signal equal to one character of the pseudo-random sequence (negative triangle near the delay +1) but, as a rule, the multipath signals with such a delay have a small amplitude and their negative effect is insignificant.

FIG. 6 presents a diagram of the distance errors of the discriminator of the/code signal depending on the delay of the multipath signal. The combination of the direct and multipath signals is presented by the dependence: $S_m(t) = A*C_f(t)*\cos(w_0 t+\Phi)+\alpha*A*C_f(t-\delta)+)+\alpha*A*C_f(t-\delta)*\cos[w_0(t-\delta)+\Phi]$, where is the amplitude of the direct signal, $C_f(t)$ is the filtered signal of the pseudo-random sequence, $w_0$ is the carrier frequency, $\Phi$ is the carrier phase, $\alpha$ is the signal relative amplitude, $\delta$ is the delay of the multipath signal relative to the direct signal.

Using the discriminator $I_{E-L}I_P+Q_{E-L}Q$ for the steady-state condition in the narrow correlator case, the signal at the discriminator output will take the form:

$E(\tau_K)=[R_f(\tau_K-d/2)-R_f(\tau_K+d/2)]R_f(\tau_K)$ $+\alpha^2[R_f(\tau_K-d/2-\delta)-R_f(\tau_K+d/2-\delta)]R_f$ $(\tau_K-\delta)$ $+\alpha[R_f(\tau_K-d/2)-R_f(\tau_K+d/2)]R_f(\tau_K-\delta)$ $\cos \Phi_m$ $+\alpha[R_f(\tau_K-d/2-\delta)-R_f(\tau_K+d/2-\delta)]$ $R_f(\tau_K)\cos \Phi_m$, $R_{f(\tau)}$ is the filtered autocorrelation function of the pseudo-random sequence, $\tau_K$ is the code tracing error, d is the delay between the early and late replicas of the pseudo-random sequence, $\Phi_m=w_0*\delta$ is the difference of phases between the direct and delayed signals.

For the case of using the narrow correlator with a train of gating signals, the signal at the discriminator output will take the form:

$E(\tau_K)=[R_f(\tau_K-d/2)-R_f(\tau_K+d/2)]R_f(\tau_K)$ $+\alpha^2[R_f(\tau_K-d/2-\delta)-R_f(\tau_K+d/2-\delta)]R_f$ $(\tau_K-\delta)$ $+\alpha[R_f(\tau_K-d/2)-R_f(\tau_K+d/2)]R_f(\tau_K-\delta)$ $\cos \Phi_m$ $+\alpha[R_f(\tau_K-d/2-\delta)-R_f(\tau_K+d/2-\delta)]$ $R_f(\tau_K)\cos \Phi_m, +$ $+S_f(\tau_K+1+d/2)R_f(\tau_K)$ $+\alpha^2 S_f(\tau_K+1)+d/2-\delta)R_f(\tau_K-\delta)$ $+\alpha S_f(\tau_K+1+d/2)R_f(\tau_K-\delta) \cos \Phi_m$, $+\alpha S_f(\tau_K+1)+d/2-\delta)R_f(\tau_K) \cos \Phi_m$, $S_f$ the filtered correlation function of the correcting impulse with a relative duration d and pseudo-random sequence signal.

By setting $\Phi_m=0$ and then $\Phi_m=\pi\alpha=0.5$, d=0.1 and solving the above equation for the case $E(\tau_K)$, it is possible to calculate the range finding error. To simplify the calculations, FIG. 6 shows the results of the range finding errors for the ideal case of a filter with an infinite pass band.

INDUSTRIAL APPLICABILITY

The above described practical embodiments of the invention prove, that the claimed method of compensation of the multibeam effect and the multichannel digital receiver for the system of global positioning based thereon are technically feasible, industrially realizable and solve the technical task of effective reception and decoding of pseudonoise signals of the GPS and GLONASS systems acted on by the multipath effect.

The invention claimed is:

1. A method of increasing noise immunity during reception of signals from satellites of navigational systems comprising:
   decoding signals having a carrier coded with a pseudo-random sequence;
   generating a local difference copy of an input signal, wherein a delay d between an early copy and a late copy of the input signal makes up a fractional part of a character of the pseudo-random sequence;
   generating an exact copy of the input signal;
   generating a sequence of gating digital signals;
   setting a length of the gating digital signals equal to the delay d;
   selecting a character polarity of the gating digital signals to coincide with a polarity of a previous character of the exact copy; and
   delaying a beginning of the gating digital signals relative to an end of the character of the exact copy of the pseudo-random sequence by a value equal to d/2.

2. The method as claimed in claim 1, further comprising:
   affecting correlation of the input signal, the input signal comprising a direct signal and a plurality of delayed multipath signals, with the exact copy and with a signal representing a mixture of the difference copy and the sequence of the gating digital signals;
   storing results of the correlation in accumulators; and
   forming a discriminator signal, for tracing a delay of the code, in a form of
   $I_{E-L+K}I_P + Q_{E-L+K}Q_P$, $I_{E-L+K}$, where $Q_{E-L+K}$ are in-phase and quadrature components of the results of correlation of the input signal with the signal representing the mixture of the difference copy and the sequence of the gating digital signals, and $I_p$, $Q_p$ are in-phase and quadrature components of the results of correlation of the input signal with the exact copy of the input signal, thereby performing the adjustment of the exact and difference copy of the input signal based on the discriminator signal so that an error signal is influenced only by the input signal of direct visibility and is not influenced by multipath signals.

3. A method as claimed in claim 2, wherein the input signal correlation is performed separately for the exact copy of the input signal, for the difference copy of the input signal and for the sequence of the gating digital signals; the correlation results are stored in corresponding quadrature accumulators; the discriminator signal is formed as $I_{E-L}I_P + Q_{E-L}Q_P$, where $I_{E-L}$, $Q_{E-L}$ are in-phase and quadrature components of the results of correlation of the input signal with the difference copy signal, $I_p$, $Q_p$ are in-phase and quadrature components of the results of correlation of the input signal with the exact copy signal, the method further comprising:
   comparing value of the accumulators containing the results of correlation of the input signal, with the sequence of gating digital signals $I_k^2 + Q_k^2$, with a threshold value of detection of a multipath effect; and
   compensating the multipath effect in excess of the threshold value by adding output value of the accumulators of gating digital signals to output value of the corresponding quadrature accumulators of the difference copy to produce a discriminator signal in the form:

$I_{E-L}I_P + Q_{E-L}Q_P + I_k I_P + Q_k Q_P$.

4. A method of increasing noise immunity during reception of signals from satellites of navigational systems comprising:
   decoding signals having a carrier coded with a pseudo-random sequence;
   generating an early copy of an input signal;
   generating a late copy of an input signal, wherein a delay d between the early and late copy of the input signal makes up a fractional part of a character of the pseudo-random sequence; generating a sequence of gating digital signals;
   setting a length of the gating digital signals equal to the delay d;
   selecting a character polarity of the gating digital signals to coincide with a polarity of a
   previous character of an exact copy of the input signal; and
   delaying a beginning of the gating digital signal relative to an end of the character of the exact copy of the pseudo-random sequence by a value equal to d/2.

5. The method as claimed in claim 4, further comprising:
   affecting correlation of the input signal, the input signal comprising, a direct signal and a plurality of delayed multipath signals, with the early copy;
   affecting correlation of the input signal with the late copy;
   affecting correlation of the input signal with a signal representing a sequence of gating digital signals;
   storing the correlation results in accumulators; and
   forming a discriminator signal, for tracing a delay of the code, in a form of $I_E^2 + Q_E^2 - I_L^2 - Q_L^2 + I_K^2 + Q_K^2$, where $I_E$, $Q_E$ are in-phase and quadrature components of the results of correlation of the early copy of the input signal, $I_L$, $Q_L$ are in-phase and quadrature components of the results of correlation of the late copy of the input signal, and $I_K$, $Q_K$ are in-phase and quadrature components of the results of correlation of the sequence of the gating digital signals.

6. A method as claimed in claim 5, further comprising, when tracing the delay of the code:
   determining a value of the discriminator signal as: $I_E^2 + Q_E^2 - I_L^2 - Q_L^2$;
   comparing a value of the accumulators storing the correlation results of the input signal with a sequence of gating digital signals $I_K^2 + Q_K^2$ with a threshold value of detection of a multipath effect; and
   compensating the multipath effect exceeding the threshold value by adding the value from the output of the accumulators to the calculated value of the discriminator to equal $I_E^2 + Q_E^2 - I_E^2 - I_L^2 - Q_L^2 + I_K^2 + Q_K^2$.

7. A device for reception of signals of satellite navigational systems transmitting a plurality of signals with a carrier, coded by pseudo-random sequences, comprising:
   a radio module receiving the input signal, converting the input signal into an intermediate-frequency signal, including a plurality of signals with an intermediate frequency carrier, coded by a pseudo-random sequence;
   an analog-to-digital converter, converting the intermediate-frequency signal into a digital signal;

a digital correlation device including a digital correlator whose each channel decodes one of the plurality of signals coded by pseudo-random sequence and converted into the digital signal;

a first generator which produces an exact copy of the signal coded by a pseudo-random sequence;

a second generator which produces a difference copy of the signal coded by the pseudo-random sequence, wherein a delay d between an early copy and a late copy of the signal makes up a fraction of a character of the pseudo-random sequence, and which generates a sequence of gating digital signals, wherein a length of the gating digital signals is equal to the delay d, a polarity of the character of the gating digital signals coincides with a polarity of the previous character of the exact copy of the signal coded by the pseudo-random sequence and a beginning of the gating digital signals is delayed relative to an end of the character of the exact copy of the pseudo-random sequence by a value equal to d/2.

8. The device as claimed in claim 7, further comprising:

a first mixer performing multiplication of quadrature counts of the input signal by counts of the exact copy of the signal coded by pseudo-random sequence;

a second mixer performing multiplication of the quadrature counts of the input signal by counts of a signal representing a mixture of the difference copy and the sequence of gating digital signals;

quadrature accumulators accumulating results of multiplication performed by the first and second mixers;

a device adjusting the delay of the exact copy of the signal coded by the pseudo-random sequence depending on an error signal from a discriminator output calculated on the basis of counts of the accumulators as: $I_{E-L+K}I_P + Q_{E-L+K}Q_P$, where $I_{E-L+K}$, $Q_{E-L+K}$ are in-phase and quadrature components of results of correlation of the input signal with the signal representing a mixture of the difference copy and the sequence of gating digital signals, $I_p$, $Q_p$ are the in-phase and quadrature components of results of correlation of the input signal with the exact copy of the signal coded by pseudo-random sequence.

9. The device as claimed in claim 8, wherein a value of the signal of the discriminator for the device adjusting the delay is determined as $I_E^2 + Q_E^2 - I_L^2 - Q_L^2$, and the value of the accumulators, which store results of correlation of the input signal with the sequence of gating digital signals $I_k^2 + Q_K^2$, is compared with a threshold value and, if a detected multipath effect exceeds the threshold value, output values of the accumulators are added to the determined value of the signal of the discriminator to equal $I_E^2 + Q_E^2 - I_L^2 - Q_L^2 + I_K^2 + Q_K^2$.

10. A device for reception of signals of satellite navigational systems transmitting a plurality of signals with a carrier, coded by pseudo-random sequences, comprising:

a radio module receiving the input signal, converting the input signal into an intermediate-frequency signal, including a plurality of signals with an intermediate frequency carrier, coded by a pseudo-random sequence;

an analog-to-digital converter, converting the intermediate-frequency signal into a digital signal;

a digital correlation device including a digital correlator whose each channel decodes one of the plurality of signals coded by pseudo-random sequence and converted into the digital signal, wherein each channel of the multichannel digital correlator comprises:

a first generator of an exact copy of the signal coded by a pseudo-random sequence;

a second generator of a difference copy of the signal coded by the pseudo-random sequence, wherein a delay d between an early copy and a late copy makes up a fraction of a character of the pseudo-random sequence;

a third generator producing a sequence of gating digital signals, wherein a length of the gating digital signals is equal to the delay d, a polarity of a character of the gating digital signals coincides with a polarity of previous character of the exact copy of the signal coded by the pseudo-random sequence and a beginning of the gating digital signals is delayed relative to an end of the character of the exact copy of the signal coded by the pseudo-random sequence by a value equal to d/2.

11. The device as claimed in claim 10, further comprising:

a first mixer performing multiplication of quadrature counts of the input signal by counts of the exact copy of the signal coded by the pseudo-random sequence;

a second mixer performing multiplication of the quadrature counts of the input signal by counts of the difference copy;

a third mixer performing multiplication of the quadrature counts of the input signal by counts of the sequence of gating digital signals;

quadrature accumulators accumulating results of the multiplication performed by the first, second and third mixers; and a device adjusting the delay of the exact copy of the signal coded by the pseudo-random sequence depending on an error signal from an output of a discriminator calculated on a basis of counts of the accumulators as $I_{E-L}I_P + Q_{E-L}Q_P + I_K I_P + Q_K Q_P$ provided that a threshold of detection of a multipath signal is exceeded, where $I_p$, $Q_p$ are in-phrase and quadrature components of results of correlation of the input signal with the exact copy signal; $I_{E-L}$, $Q_{E-L}$ are in-phrase and quadrature components of results of correlation of the input signal with the difference copy signal; and $I_k$, $Q_k$ are in-phrase and quadrature components of results of correlation of the sequence of gating digital signals.

12. The device as claimed in claim 10, further comprising:

a first mixer performing multiplication of quadrature counts of the input signal by counts of the exact copy of the signal coded by pseudo-random sequence;

a second mixer performing multiplication of the quadrature counts of the input signal by counts of the difference copy;

a third mixer performing multiplication of the quadrature counts of the input signal by counts of the sequence of gating digital signals;

quadrature accumulators accumulating results of the multiplication performed by the first, second and third mixers; and a device adjusting the delay of the exact copy of the signal coded by the pseudo-random sequence depending on an error signal from a discriminator output calculated on a basis of counts of the accumulators as: $I_{E-L}I_P + Q_{E-L}Q_P$, where $I_{E-L}$, $Q_{E-L}$ are in-phase and quadrature components of results of correlation of the input signal with the difference copy, $I_K^2 + Q_K^2$ does not exceed a threshold of detection of a multipath signal, and $I_K$, $Q_K$ are in-phase and quadrature components of results of correlation of the sequence of gating digital signals.

13. A device for reception of signals of satellite navigational systems transmitting a plurality of signals with a carrier, coded by pseudo-random sequences, comprising:

a radio module receiving the input signal, converting the input signal into an intermediate-frequency signal, including a plurality of signals with an intermediate frequency carrier, coded by a pseudo-random sequence;

an analog-to-digital converter, converting the intermediate-frequency signal into a digital signal;

a digital correlation device including a digital correlator whose each channel decodes one of the plurality of signals coded by pseudo-random sequence and converted into the digital signal, wherein each channel of the multichannel digital correlator comprises:

a first generator producing an early copy of a signal coded by a pseudo-random sequence;

a second generator producing a late copy of the signal coded by the pseudo-random sequence, wherein a delay d between the early and late copies makes up a fraction of a character of the pseudo-random sequence;

a third generator producing a sequence of gating digital signals, wherein a length of the gating digital signals is equal to the delay d, a polarity of a character of the gating digital signals coincides with a polarity of previous character of an exact copy of the signal coded by the pseudo-random sequence and a beginning of the gating digital signals is delayed relative to an end of the character of the exact copy of the signal coded by the pseudo-random sequence by a value equal to d/2.

14. The device as claimed in claim 13 further comprising:

a first mixer performing multiplication of quadrature counts of the input signal by counts of the early copy;

a second mixer performing multiplication of the quadrature counts of the input signal by counts of the late copy;

a third mixer performing multiplication of the quadrature counts of the input signal by counts of the sequence of the gating digital signals;

quadrature accumulators accumulating results of the multiplication performed by the first, second and third mixers; and a device adjusting the delay of the exact copy of the signal coded by the pseudo-random sequence depending on an error signal from a discriminator output calculated on a basis of counts of the accumulators as: $I_E^2+Q_E^2-I_L^2-Q_L^2+I_K^2+Q_K^2$, where $I_E, Q_E$ are in-phase and quadrature components of results of correlation of the early copy, $I_p$, $Q_p$ are in-phase and quadrature components of results of correlation of the late copy, and $I_K$, $Q_K$ are the in-phase and quadrature components of results of correlation of the sequence of gating digital signals.

* * * * *